C. H. JACOBS.
TIRE-TIGHTENER.

No. 190,331. Patented May 1, 1877.

WITNESSES:
Charles S. Ford
W. H. Wilcox

INVENTOR:
Charles H. Jacobs
By G. W. Lovell Atty

N. PETERS, PHOTO-LITHOGRAPHER, WASHINGTON, D.C.

UNITED STATES PATENT OFFICE.

CHARLES H. JACOBS, OF WINNEBAGO, ILLINOIS.

IMPROVEMENT IN TIRE-TIGHTENERS.

Specification forming part of Letters Patent No. 190,331, dated May 1, 1877; application filed June 5, 1876.

*To all whom it may concern:*

Be it known that I, CHARLES H. JACOBS, of Winnebago, in the county of Winnebago and State of Illinois, have invented a new and useful Improvement in Tire-Tighteners; and I do hereby declare that the following is a full and exact description of the same, reference being had to the accompanying drawings, and to the letters of reference marked thereon.

Figure 1:
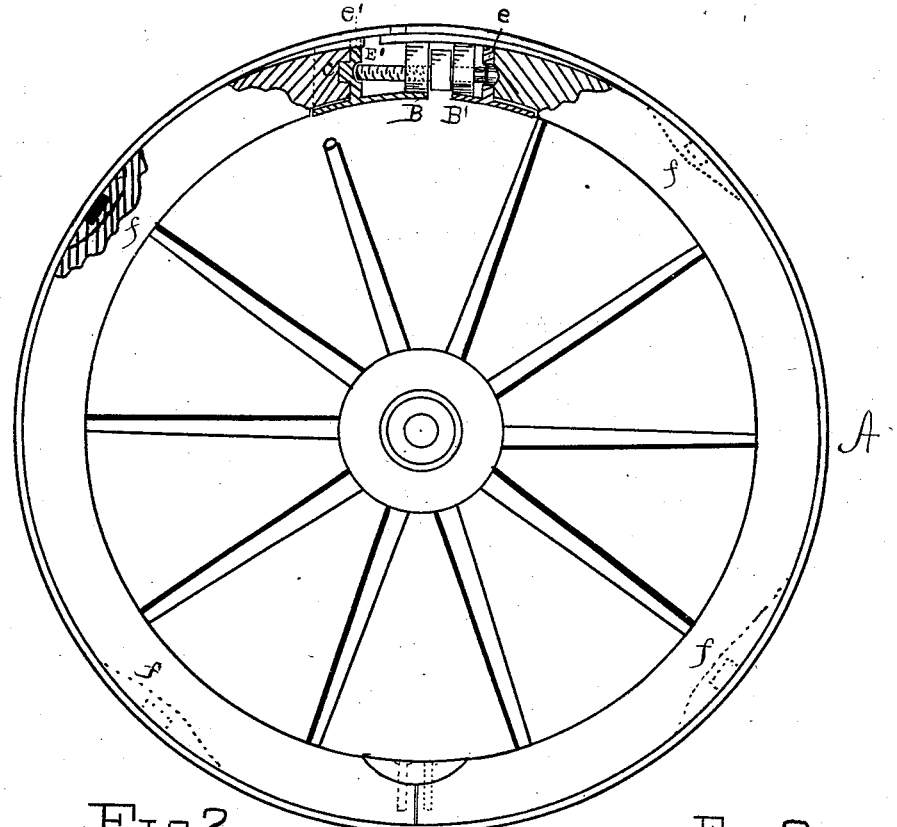
Figure 2:
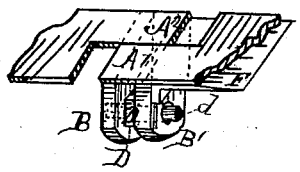
Figure 3:
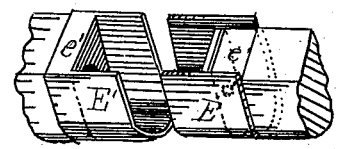

Figure 1 is a sectional view on the plane of the wheel, showing the tightening-screw, also the lugs for preventing lateral displacement of the tire. Fig. 2 is a section of the tire at the lap detached from the felly; and Fig. 3, a section of the felly, showing the sockets which inclose the tightening-screw.

Similar letters of reference denote corresponding parts in all the figures.

This is an improvement upon the tire-tighteners for which a patent was granted to Milo E. Jacobs, September 9, 1873, numbered 142,632, the same being now owned by me, and consists in the manner of operating upon the tire direct without disturbing the arch of the wheel, by either contraction or expansion of the felly, as is commonly done.

It is well known that the wooden portions of wagon-wheels are largely affected by the weather, becoming swollen when in use during wet weather, and shrunken in warm and dry weather, while in the metal portions the variations are less marked, and as the wood draws away from the metal the metal must, by mechanical means, be made to closely adhere to the wood, in order that the full strength may be maintained. To shorten the tire, usually it is removed from the wheel and a portion cut out, or shortened by upsetting the metal by compression, which causes a close contact of the metal and wood, while the wood is still shrunken, but when the said wood shall again become swollen by the water, the pressure is against the metal rim or tire, causing the wheel to dish or push sidewise, which again materially weakens the same. To obviate these difficulties this invention has been made, and consists of a regulating-screw, which enters a corresponding nut, made fast to one portion of the open tire, which will be hereinafter described.

A is the tire, and $A^1$ $A^2$ are laps made in the same by cutting away one-half of the width on each end, and in order that the lap may be strengthened the remaining portions are increased in thickness by the welding or upsetting process, but so constructed that the said ends shut by each other. B is a screw-nut, secured to the end of the tire designated $A^1$, and into which the screw-bolt D enters. $B'$ is a lug, extending inwardly from the end of the tire designated $A^2$, the same corresponding in size and shape with the nut B. Into this lug a tenon, $d$, forming a part of the screw-bolt D, enters, and extends beyond sufficiently far to hold in position the socket E, which encircles one end of the felly. This socket E is divided in the longitudinal center by the center-plate $e$, into which the tenon $d$ extends, and against which the head of the bolt D rests, thus forming a shoulder for the same. $E'$ is a socket, having a divide-plate, $e'$, which covers the screw D with the longer portion, while the shorter portion encircles the end of the felly not covered by socket E. To the divide-plate $e'$, on the side next to the felly, is a lug or tenon, $c$, which enters the end of the felly and takes the place of the ordinary dowel, commonly used, while the tenon $d$ or screw-bolt extension, which passes through the center-plate $e$, takes the place of the dowel on the opposite end of the felly, by which the parts, in connection with the sockets, are held in a secure position. F is a metal guard, secured to nut B, moving with the same, for the purpose of covering the screw-threaded portions of the bolt D, to prevent the hindrance of the working through the interference of dirt. If desired, the opening in the felly can be covered by a cap, or in any other well-known manner, but I prefer the method shown, on account of its simplicity, and it does not necessitate the removal of bolts or nuts when it becomes necessary to operate the tightening-bolt. $f$ are lugs placed at suitable distances apart upon the inner face of the tire, and entering grooves made in the periphery of the felly, and by which the lateral displacement of the tire is effected, the grooves being of sufficient length to allow of the expansion and contraction of the tire without injury to the felly.

The operation is as follows: When the tire is to be loosened the screw-bolt is by the use of an ordinary wrench, turned in the direction to run into the nut, (thus acting the reverse of ordinary tire-tighteners wherein a screw-bolt is used,) which allows of the spreading of the tire. When the tire is to be tightened, the bolt is turned in the direction to withdraw from the nut, and pushes against the nut on one end and against the lug on the other end, the parts being so constructed that by this pushing movement the lapped ends are drawn past each other and toward the shoulder or notch in the tire, made by removing the parts to form this lap.

It will be observed that by this operation the felly is not disturbed, as the action is upon the tire alone, the large opening in the felly, necessary for the working of a right-and-left-hand screw is not required, the lap is strengthened by the extra metal before mentioned, and by the nut and lug, which are both supplied with flat bearings upon which the ends rest, the nut and lug being also made to conform in shape with the concavity in the socket-pieces resting upon them, thus rendering the joint as a whole strong, durable, and of simple construction.

I am aware that tire-tighteners have been heretofore made in which lugs at or near the ends of the tire are drawn together by a screw. This is not my invention; but

What I claim is—

1. A wagon-wheel tire having the lateral laps A A$^1$, terminating in the perforated and screw-tapped lug B, and the perforated lug B' having a dust-guard, F, in combination with the bolt D having a tenon, $d$, and so arranged that by forcing the lugs apart the tire may be tightened, all substantially as described and shown.

2. In combination with a wagon-wheel tire, having the lateral lapped ends A A$^1$ and lugs B B' and $f$, the screw-bolt D, and the sockets E E', fastened to the meeting-ends of the felly, substantially as described and shown.

This specification signed and witnessed this 3d day of April, 1876.

CHARLES H. JACOBS.

Witnesses:
 G. W. FORD,
 CHARLES S. FORD.